United States Patent
Mills

(10) Patent No.: US 12,022,824 B2
(45) Date of Patent: *Jul. 2, 2024

(54) SOIL BLENDS CONTAINING AN INSECTICIDE AND METHODS FOR PRODUCTION AND USE THEREOF

(71) Applicant: MED-X, INC., Canoga Park, CA (US)

(72) Inventor: Matthew W. Mills, West Hills, CA (US)

(73) Assignee: Med-X, Inc., Canoga Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/502,228

(22) Filed: Oct. 15, 2021

(65) Prior Publication Data

US 2022/0030853 A1 Feb. 3, 2022

Related U.S. Application Data

(63) Continuation of application No. 15/168,283, filed on May 31, 2016, now Pat. No. 11,147,266.

(60) Provisional application No. 62/170,320, filed on Jun. 3, 2015.

(51) Int. Cl.
*A01N 25/08* (2006.01)
*A01N 61/00* (2006.01)
*A01P 7/04* (2006.01)

(52) U.S. Cl.
CPC ............ *A01N 25/08* (2013.01); *A01N 61/00* (2013.01); *A01P 7/04* (2021.08)

(58) Field of Classification Search
CPC ............ A01N 25/08; A01N 61/00; A01P 7/04
See application file for complete search history.

(56) References Cited

U.S. PATENT DOCUMENTS

| | | |
|---|---|---|
| 4,900,758 A | 2/1990 | Fisher |
| 7,247,377 B2 | 7/2007 | Jassan et al. |
| 7,488,703 B2 | 2/2009 | Rubin |
| 2016/0000093 A1 | 1/2016 | Lamb et al. |

FOREIGN PATENT DOCUMENTS

WO 0021364 A2 4/2000

OTHER PUBLICATIONS

Peterson et al, "Catnip Essential Oil as a Barrier to Subterranean Termites (*Isoptera: Thinotermitidae*) in the Laboratory", Journal of Economic Entomology, vol. 96, No. 4, pp. 1275-1282, (2003).

Oka et al, "Nematicidal activity of essential oils and their components against the root-knot nematode", Phytopathology, vol. 90, pp. 710-715, (2000).

*Primary Examiner* — Erin E Hirt
*Assistant Examiner* — Nathan W Schlientz
(74) *Attorney, Agent, or Firm* — Lathrop GPM LLP; Lisa Hillman

(57) ABSTRACT

Effective delivery of an insecticide to a growing plant can sometimes be problematic. Topical delivery of an insecticide at the post-emergence stage of growth can sometimes be ineffective. It can also be difficult to deliver an insecticide to the roots of a growing plant, such as to combat a subsurface insect infestation. Accordingly, soil blends having insecticidal activity can comprise a soil medium, a porous soil additive, and an insecticide dispersed within the soil medium. Such soil blends may be used in conjunction with cultivating a variety of plants. Methods for producing the soil blends can comprise providing a soil medium and a porous soil additive, and dispersing the porous soil additive and an insecticide within the soil medium.

14 Claims, No Drawings

SOIL BLENDS CONTAINING AN INSECTICIDE AND METHODS FOR PRODUCTION AND USE THEREOF

CROSS-REFERENCE TO RELATED APPLICATIONS

The present application is a continuation of U.S. application Ser. No. 15/168,283, filed on May 31, 2016, which claims the benefit of priority under 35 U.S.C. § 119 from U.S. Provisional Patent Application 62/170,320, filed on Jun. 3, 2015 and are incorporated herein by reference in their entirety.

BACKGROUND

The present disclosure generally relates to soil blends and, more specifically, to soil blends having insecticidal activity and plant cultivation therein.

Soil blends, sometimes referred to soil growth media, can include a combination of components that promote plant growth. Oftentimes, the particular combination of components can be tailored for promoting growth of a certain type of plant therein. As used herein, the term "soil blend" will refer to any mixture of a soil medium with one or more additives that may or may not be tailored to promote growth of a certain type of plant. The one or more additives may facilitate growth of certain types of plants in the soil blend or promote growth under particular types of growing conditions, such as through supplying essential nutrients, modifying the soil blend's water content and propensity to retain moisture, modifying the soil blend's porosity, adjusting pH, and/or the like. Although soil blends are sometimes referred to as "potting soil," soil blends can also be utilized in larger applications, such as but not limited to flower beds, raised gardens, and the like. Further, soil blends can also replace or supplement the native soil present in a given location for even larger cultivation activities.

Disease and insect attack can compromise the viability of plants even when they are growing under otherwise favorable conditions, such as in a designed soil blend. The attack of insects or microorganisms upon a growing plant can often be exceeding detrimental. Once insect-induced stress to a growing plant has occurred, it can often be too late to reverse the damage. At worst, the plant may die. Even under the best of circumstances, the plant may fail to thrive or produce to an expected degree.

Both the foliage and roots of a plant can be susceptible to attack by insects. Although insecticides or similar agents can sometimes be used to address an insect attack within a growing plant, these substances are usually applied topically to the plant post-emergence, frequently after insect-induced stress has already been observed. As indicated previously, the viability of a growing plant can already be compromised by this time. In addition, topical contact of an insecticide or similar material with the foliage of a growing plant can sometimes be problematic, possibly resulting in chemical damage to the plant and/or rendering the plant unsuitable for consumption as a food source. For certain plant products to be considered as being organically grown, some topical insecticides may be wholly unsuitable. Furthermore, when an insect attack occurs at a subsurface location (e.g., at the roots or the subsurface stalk of a growing plant), reactive topical administration of an insecticide can oftentimes fail to bring the insect attack under control. Subsurface insect attacks can also be especially problematic to address due to the difficulty of delivering an insecticide to this location.

SUMMARY

In various embodiments, the present disclosure describes soil blends comprising a soil medium, a porous soil additive, and an insecticide dispersed within the soil medium.

In other various embodiments, the present disclosure describes methods for cultivating a plant in a soil blend containing an insecticide. The methods comprise: providing a soil blend comprising a soil medium, a porous soil additive, and an insecticide dispersed within the soil medium; cultivating a growing plant within the soil blend; and exposing the growing plant to the insecticide at a subsurface location within the soil blend.

In still other various embodiments, the present disclosure provides methods for preparing soil blends containing an insecticide. The methods comprise providing a soil medium and a porous soil additive, and dispersing the porous soil additive and an insecticide within the soil medium.

Accordingly, the features and advantages of the present disclosure will become apparent to one having ordinary skill in the art upon a reading of the description that follows.

BRIEF DESCRIPTION OF THE DRAWINGS

Not applicable.

DETAILED DESCRIPTION

The present disclosure generally relates to soil blends and, more specifically, to soil blends having insecticidal activity and plant cultivation therein.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, growing plants can often be susceptible to attack by insects, but an insect infestation can sometimes be difficult to control. This can decrease the viability and/or yield of various plants, for example. Although insecticides can sometimes be used to address an insect infestation, they are often applied topically to a growing plant in reaction to an infestation that has already occurred. Pre-emergent utilization of an insecticide to address an ongoing or future insect infestation proactively is not believed to be a known strategy at present.

In addition to the above concerns, insect infestations originating from a subsurface location can be especially problematic, since they can be difficult to detect and can inflict considerable damage upon a plant before they can be adequately addressed. Further, subsurface insect infestations can be quite difficult to remedy due to the issues associated with effective delivery of an insecticide to a subsurface location.

To address the foregoing issues, the present inventor discovered that insecticides and similar substances can be directly incorporated within a soil blend itself. Doing so can provide a number of distinct advantages. First, insecticides can be readily incorporated in a variety of soil blends adapted for growing a wide range of plants, but without compromising the desirable growth features of the soil blend. Second, incorporating an insecticide directly within a soil blend allows proximate delivery of the insecticide to the roots and other subsurface locations of a growing plant, which can be more effective than post-emergence topical delivery in some instances. Both foliage-based and subsurface-based insect infestations can be addressed in this manner. Subsurface delivery of an insecticide can allow for proactive protection against insects to be realized throughout the entirety of a plant's life cycle. Insecticidal activity may also extend to subsequent cultivation cycles in some instances. Finally, a wide range of insecticides and similar substances can be suitable for incorporation within a soil blend according to the present disclosure, and facile incorporation techniques can be used in this regard.

In some instances, the foregoing features and advantages can be realized through infiltrating an insecticide or similar substance within a porous soil additive that is contained within the soil blend, thereby temporarily sequestering the insecticide therein. As used herein, the term "porous" refers to the characteristic of having pores or openings within a material, such that the material has absorbing characteristics. Porous soil additives are already used in some soil blends to promote moisture retention, alternately to promote drainage capabilities, and/or to modify the soil blend's density. Thus, infiltrating an insecticide within an existing porous soil additive is not believed to significantly alter the formulation and/or functionality of the soil blend. Further, the insecticide can become infiltrated within the porous soil additive when simply mixing the various components of a soil blend together. Alternately, an insecticide can be loaded within a porous or absorbing soil additive before admixing the porous soil additive with a soil medium to formulate the soil blend. In either case, the insecticide can leech from the porous or absorbing soil additive over time, thereby exposing the roots and subsurface stalk of a growing plant to the insecticide and conveying insecticidal protection to the plant. One or more additional soil additives can further tailor the soil blend toward effective growth for one or more particular types of plants, in addition to providing other beneficial effects.

Exposure of the growing plant to the insecticide in the soil blends of the present disclosure can take place at the time of planting as well as when the soil blend is watered to promote plant growth, and water percolates through the soil blend and the porous soil additive. The percolating water can release and/or carry the insecticide into the soil blend in proximity to the roots of a growing plant. Subsurface delivery of the insecticide to the growing plant in this manner can at least partially obviate the need for application of a topical insecticide at the post-emergence stage of growth. Accordingly, post-emergence insecticides may be omitted altogether, their use may be lessened, and/or more benign post-emergent insecticides may be utilized. In doing so, a stronger and healthier plant may result, since the initial stress of fighting off an insect infestation may be decreased or overcome entirely, not to mention the benefits of avoiding potential damage associated with use of the insecticide itself.

Accordingly, soil blends of the present disclosure can comprise a soil medium, a porous soil additive, and an insecticide dispersed within the soil medium. In some instances, the insecticide can be at least partially infiltrated within the porous soil additive (i.e., adsorbed within the porous features of the porous soil additive).

Types of soil media that can be combined with the porous soil additive and the insecticide are not considered to be particularly limited. Suitable types of soil media can include, for example, naturally occurring sandy soils, silty soils, clay soils, peat-containing soils, saline soils or any combination thereof. In various embodiments, the soil medium can comprise top soil or subsoil. In some or other various embodiments, the soil medium being combined with the porous soil additive and the insecticide may comprise compost, clays, sand, or any combination thereof. Compost, clays, sand, and other types of soil media can also be combined together or with any of the aforementioned types of soil media. A particular soil medium can be chosen to promote growth of a given type of plant or to facilitate plant growth under a particular set of environmental conditions. Such considerations will be familiar to one having ordinary skill in the art.

Porous soil additives suitable for use in conjunction with the embodiments of the present disclosure are not believed to be particularly limited, provided that they are not detrimental for plant growth. In some embodiments, suitable porous soil additives for incorporation within the soil blend include volcanic rock particles (i.e., pumice), perlite, and/or clay particles. Volcanic rock particles are highly porous and lightweight, which can allow high loadings of infiltrated insecticide to be achieved. Likewise, clay particles have a layered structure with large-volume interstitial galleries that can allow significant quantities of insecticide to become incorporated therein. Moreover, clay particles can swell and contract upon exposure to different ionic conditions, which may promote retention or release of the insecticide therefrom upon generating a particular set of conditions within the soil blend. Other porous soil additives that can be used similarly to volcanic rock particles, perlite, or clay particles include, for example, vermiculite, and ocean sponge organisms.

One or more additional soil additives can also be combined with the soil blends described herein. Such additional soil additives are not believed to be particularly limited in type or function and may include, in any combination and amount, coco coir (i.e., coconut husks), bat guano, worm castings, fish castings, glacial rock dust, azomite, lime, kelp meal, mycorrihizae, alfalfa meal, langbeinite, humic acid, manure, diatomaceous earth and the like. Many of these soil additives are known in the field of organic gardening and will be familiar to one having ordinary skill in the art. As with the type of soil medium chosen for formulating the soil blend, the types and amounts of the one or more additional soil additives can be chosen to promote growth of a particular type of plant in many instances.

Insecticides suitable for use in conjunction with the present disclosure are similarly not believed to be particularly limited. Both systemic insecticides and contact insecticides can be used in this regard. Some non-limiting examples of insecticides that can be incorporated within the soil blends of the present disclosure include, for example, pyrethroids, neonicotinoids, ryanoids, isothiocyantes, carbamates, plant-derived essential oils, the like, and any combination thereof. The insecticides can be in a liquid form when being dispersed within the soil medium. Either a solution or dispersion of the insecticide or a neat liquid insecticide can be used in this regard.

In some embodiments, one or more plant-derived essential oils can be particularly desirable insecticides for use in conjunction with the soil blends of the present disclosure. As used herein, the term "essential oil" will refer to an organic compound extracted from a plant that gives the plant its characteristic odor and/or characteristic properties. Advantageously, many essential oils are substantially non-toxic to plants and humans, are inexpensive, and provide good activity against a range of insects. In some embodiments, one or more plant-derived essential oils can be formulated with an aqueous carrier and an emulsifier to maintain the oil(s) in a dispersed state for dispensation into the soil medium, for example. Suitable emulsifiers for dispersing essential oils into water can include those emulsifiers that are generally non-toxic to growing plants. Some examples of suitable emulsifiers can include, for example, soaps, lecithin, glycerin, myristic acid, oleate or stearate salts (e.g., potassium oleate or potassium stearate), TWEEN emulsifiers (e.g., TWEEN-80), and any combination thereof.

In more particular embodiments, suitable essential oils for use in the soil blends of the present disclosure can include, for example, cedarwood oil, cinnamon oil, citronella oil, clove oil, corn oil, mint oil, cottonseed oil, garlic oil, geranium oil, lemongrass oil, linseed oil, oregano oil, peppermint oil, rosemary oil, sesame oil, soybean oil, spearmint oil, thyme oil, the like, and any combination thereof. Other suitable essential oils can include, for example, almond oil, castor oil, rose oil, eucalyptus oil, lavender oil, tea tree oil, lemon oil, orange oil, olive oil, palm oil, *Litsea cubeba* oil and the like. Other natural ingredients such as, for example, caffeine, citric acid, corn gluten meal, eugenol, geraniol, lauryl sulfate, malic acid, 2-phenylethyl propionate, potassium sorbate, sodium chloride, sodium lauryl sulfate, thymol, white pepper, and zinc may also be present in the soil blends of the present disclosure. At least some of the foregoing materials are identified as being minimum risk pesticide products under 40 CFR 1.525(f), and some are identified therein as being safe for use in conjunction with food products.

In various embodiments, a loading of the insecticide in the soil blends of the present disclosure can range between about 2 wt. % and about 20 wt. % of the soil blend. In more particular embodiments, the loading of the insecticide can range between about 3 wt. % and about 10 wt. % or between about 2 wt. % and about 5 wt. %, or between about 5 wt. % and about 10 wt. %.

Similarly, in various embodiments, a loading of the porous soil additive in the soil blends of the present disclosure can range between about 0.5 wt. % to about 10 wt. % of the soil blend. In more particular embodiments, a loading of the porous soil additive can range between about 1 wt. % and about 10 wt. %, or between about 2 wt. % and about 5 wt. %, or between about 5 wt. % and about 10 wt. %.

The present disclosure also contemplates methods for cultivating a growing plant in the soil blends described herein. In various embodiments, the methods can comprise: providing a soil blend comprising a soil medium, a porous soil additive, and an insecticide dispersed within the soil medium; cultivating a growing plant within the soil blend; and exposing the growing plant to the insecticide at a subsurface location within the soil blend.

In some embodiments, the insecticide can be at least partially infiltrated within the porous soil additive before being exposed to the growing plant at a subsurface location within the soil blend. Accordingly, in still further embodiments, the cultivation methods can also include releasing the insecticide from the porous soil additive, thereby exposing the insecticide to the growing plant. For example, in some embodiments, the insecticide can be released from the porous soil additive when watering the soil blend or the growing plant. The release rate of the insecticide from the porous soil additive can be dependent upon, for example, the nature of the insecticide, the amount and frequency of watering, and the nature of the porous soil additive, among other factors.

In still other embodiments, the cultivation methods can further comprise applying a topical insecticide to the growing plant. The topical insecticide applied to the growing plant can be the same insecticide as released from the soil blend or a different insecticide. For example, in some embodiments, a first insecticide can be released from a soil blend of the present disclosure to control subsurface insects, and a second insecticide can be applied topically to control either surface-based insects and/or to supplement the action of the first insecticide. Alternately, both the first and second insecticides can be used to control surface-based insects. In some embodiments, the topically applied second insecticide can represent a more benign insecticide substance than would ordinarily be used when treating a growing plant with a topical insecticide. In alternative embodiments, a topical insecticide can be omitted during cultivation of the growing plant.

The types of plants that can be cultivated in the soil blends of the present disclosure are not considered to be particularly limited. Fruits, vegetables, indoor houseplants, outdoor houseplants, turfgrass, and the like may be cultivated using the various soil blends disclosed herein. Further, soil blends can be configured for cultivation of particular types of plants through appropriate modification of the disclosure herein.

Similarly, the types of insects that can be controlled with the soil blends of the present disclosure are not considered to be particularly limited. In illustrative embodiments, mites, aphids, root aphids, scala, and the like may be controlled with the soil blends of the present disclosure.

As indicated above, methods of the present disclosure can include dispersing the insecticide in the soil medium before cultivating the growing plant within the soil blend. Suitable methods of incorporating the insecticide before cultivation of a plant are discussed in more detail herein.

In alternative approaches, the insecticide can be dispersed in the soil blend after cultivation of the plant has begun. For example, in some embodiments, an insecticide, optionally infiltrated within a porous soil additive, can be introduced to a soil blend to realize advantages similar to those noted above. In illustrative embodiments, a spike or stake containing an insecticide at least partially infiltrated within a porous soil additive can be introduced into a location in soil following planting. Afterward, the insecticide can be released from the porous soil additive, as discussed in more detail above. Such introduction strategies can be employed at any stage in the life cycle of a plant, both pre-emergence and post-emergence. Further, both subsurface and surface insect infestations may be addressed by the foregoing approach.

In still other embodiments of the present disclosure, methods for incorporating an insecticide within a soil blend are described herein. In more specific embodiments, such methods can comprise providing a soil medium and a porous soil additive, and dispersing the porous soil additive and an insecticide within the soil medium. As indicated above, such methods can be used to introduce the insecticide to the soil blend before cultivation of a plant begins. In additional embodiments, such methods can further comprise blending or more additional soil additives with the soil blend.

As indicated above, dispersing an insecticide within a soil medium can further comprise at least partially infiltrating the insecticide within the porous soil additive. Disposition of the insecticide in this manner can allow slow release of the insecticide to take place at a subsurface location in proximity to the roots of the growing plant.

Infiltration of the insecticide into the porous soil additive can take place in a variety of manners. In some embodiments, the insecticide can be directly blended with the soil medium and the porous soil additive. For example, in some embodiments, a solution of the insecticide can be combined with the soil medium and the porous soil additive in a hopper and undergo mixing to disperse the insecticide in the soil blend. The resulting "wet" soil blend can then be used directly for cultivating a plant, transported to a suitable holding location, or bagged for use at a later time.

In other embodiments, the insecticide can be at least partially infiltrated within the porous soil additive before the insecticide is dispersed within the soil medium. For example, in some embodiments, at least partially infiltrating the insecticide within the porous soil additive can comprise soaking the porous soil additive with a solution of the insecticide. Upon infiltrating the porous soil additive with the insecticide, the infiltrated porous soil additive can then undergo mixing (e.g., in a hopper) to produce a soil blend of the present disclosure. Again, the resulting soil blend can then be used directly or undergo storage or bagging for use at a later time.

More specifically, by soaking a porous soil additive with a liquid insecticide or a liquid solution of a solid insecticide, the insecticide may undergo deposition within channels or like porous features of the porous soil additive. A loading of the insecticide within the porous soil additive can be adjusted to some degree by moderating the insecticide concentration, the time of soaking, and/or by applying pressure during soaking. Upon obtaining the insecticide-infused porous soil additive, it can be blended with a soil medium to introduce a desired quantity of the insecticide into the soil blend. The desired quantity of the insecticide within the soil blend is not considered to be particularly limited and may be dictated, at least to some degree, by the type of plant that is destined to be grown in the soil blend.

Alternately, the porous soil additive can be mixed with the soil medium beforehand to form a soil blend, and the insecticide can be applied to the soil blend after mixing. When proceeding in this manner, the insecticide can become infiltrated within the porous soil additive in a similar manner to the soaking technique described above.

In addition to carrying the insecticide within the soil blend, the porous soil additive may lessen the density of the soil and better promote water and air percolation therethrough, both of which may help promote plant growth.

The quantity of the porous soil additive introduced into the soil blend can be dictated, at least somewhat, by the quantity of insecticide that is intended for introduction to the soil blend. In addition, in some embodiments, a porous soil additive that is not infused with the insecticide may be combined with porous soil additive that is infused with the insecticide. The combination of a porous soil additive lacking the insecticide may help to further tailor the density of the soil blend in order to promote plant growth.

To facilitate a better understanding of the embodiments of the present disclosure, the following examples of preferred or representative embodiments are given. In no way should the following examples be read to limit, or to define, the scope of the disclosure.

Example: A one-year cultivation study was conducted in a soil blend of the present disclosure under artificial light in an indoor environment. 10 plants were grown side-by-side with 10 control plants grown in a similar conventional soil blend lacking an insecticide. There were three vegetative blooms and harvests during the study period. Plants cultivated in the soil blends containing an insecticide did not need to be treated with an insecticide to grow satisfactorily. In contrast, the 10 control plants each needed treatment at least once per month during both vegetative and blooming cycles for effective pest control to be realized.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A soil blend comprising:

a soil medium;

a porous soil additive comprising volcanic rock particles, perlite, or a combination thereof, wherein loading of the porous soil additive is between about 0.5 wt % and 10 wt % of the soil blend; and an insecticide dispersed within the soil medium, wherein the insecticide comprises (i) an emulsifier and (ii) cedarwood oil, cinnamon oil, clove oil, cottonseed oil, corn oil, geraniol, or combinations thereof,
wherein the insecticide is at least partially infiltrated within the porous soil additive; and
wherein loading of the insecticide is between about 2% and 10 wt % of the soil blend.

2. The soil blend of claim 1, further comprising: one or more additional soil additives.

3. The soil blend of claim 1, wherein the insecticide further comprises an aqueous carrier.

4. A method of cultivating a plant comprising:
providing a soil blend comprising:
a soil medium;
a porous soil additive comprising volcanic rock particles, perlite, or a combination thereof, wherein loading of the porous soil additive is between about 0.5 wt % and 10 wt % of the soil blend; and
an insecticide dispersed within the soil medium, wherein the insecticide comprises (i) an emulsifier and (ii) cedarwood oil, cinnamon oil, clove oil, cottonseed oil, corn oil, geraniol, or combinations thereof; wherein loading of the insecticide is between about 2% and 10 wt % of the soil blend;
cultivating a growing plant within the soil blend; and
exposing the growing plant to the insecticide at a subsurface location within the soil blend, wherein the insecticide is at least partially infiltrated within the porous soil additive before being exposed to the growing plant.

5. The method of claim 4, further comprising: releasing the insecticide from the porous soil additive.

6. The method of claim 5, wherein the insecticide is released from the porous soil additive when watering the growing plant.

7. The method of claim 4, further comprising:
applying a topical insecticide to the growing plant.

8. The method of claim 4, wherein the soil blend maintains insecticidal activity over two or more cultivation cycles.

9. The method of claim 4, further comprising: dispersing the insecticide in the soil medium before cultivating the growing plant within the soil blend.

10. A method for production of a soil blend comprising:
providing a soil medium and a porous soil additive comprising volcanic rock particles, perlite, or a combination thereof, wherein loading of the porous soil additive is between about 0.5 wt % and 10 wt % of the soil blend; and
dispersing the porous soil additive and an insecticide within the soil medium,
wherein the insecticide comprises (i) an emulsifier and (ii) cedarwood oil, cinnamon oil, clove oil, cottonseed oil, corn oil, geraniol, or combinations thereof, wherein loading of the insecticide is between about 2% and 10 wt % of the soil blend, and wherein the insecticide is at least partially infiltrated within the porous soil additive.

11. The method of claim 10, wherein the insecticide is at least partially infiltrated within the porous soil additive before the insecticide is dispersed within the soil medium.

12. The method of claim 11, wherein at least partially infiltrating the insecticide within the porous soil additive comprises soaking the porous soil additive with a solution of the insecticide.

13. The method of claim 10, wherein the insecticide is directly blended with the soil medium and the porous soil additive.

14. The method of claim 10, further comprising: blending one or more additional soil additives with the soil blend.

* * * * *